United States Patent [19]
Rist

[11] 3,876,047
[45] Apr. 8, 1975

[54] FREE-WHEELS

[75] Inventor: Michel Rist, Boulogne-Billancourt, France

[73] Assignee: Societe Anonyme Francaise du Ferodo, Paris, France

[22] Filed: June 26, 1973

[21] Appl. No.: 373,900

[30] Foreign Application Priority Data
June 30, 1972 France.................. 72.23733

[52] U.S. Cl.................... 192/45; 192/41 A
[51] Int. Cl.................. F16d 41/06; F16d 15/00
[58] Field of Search................. 192/44, 45, 41 A

[56] References Cited
UNITED STATES PATENTS

| | | | |
|---|---|---|---|
| 3,011,606 | 12/1951 | Ferris et al. | 192/45 |
| 3,017,002 | 1/1962 | Marland | 192/45 |
| 3,406,799 | 10/1968 | Helmer | 192/45 |
| 3,500,977 | 3/1970 | Gehrke | 192/45 |

Primary Examiner—Allan D. Herrmann
Attorney, Agent, or Firm—Young & Thompson

[57] ABSTRACT

The present invention relates to a free-wheel constituting a one-way coupling device and comprising a circular series of jamming members adapted to be interposed between an outer track and an inner track coaxial with each other, a plurality of ramps provided on at least one of said tracks, said ramps being adapted to co-operate with said jamming members, a synchronization cage for housing said jamming members, said cage being subjected to an elastic restoring action, and two lateral closure rings, coupling means for directly interconnecting said closure rings so as to fix said rings angularly to said track with ramps, said elastic restoring means acting on said cage being constituted by springs of circular arcuate form, hooked at one extremity on said synchronization cage and at the other extremity on said lateral closure rings.

An important application of the invention is to hydrokinetic torque converters.

8 Claims, 8 Drawing Figures

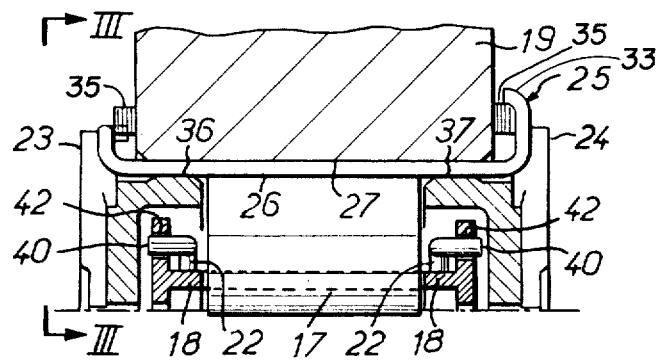
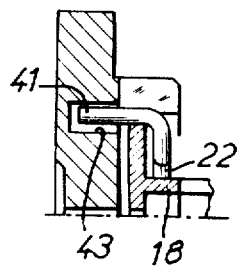
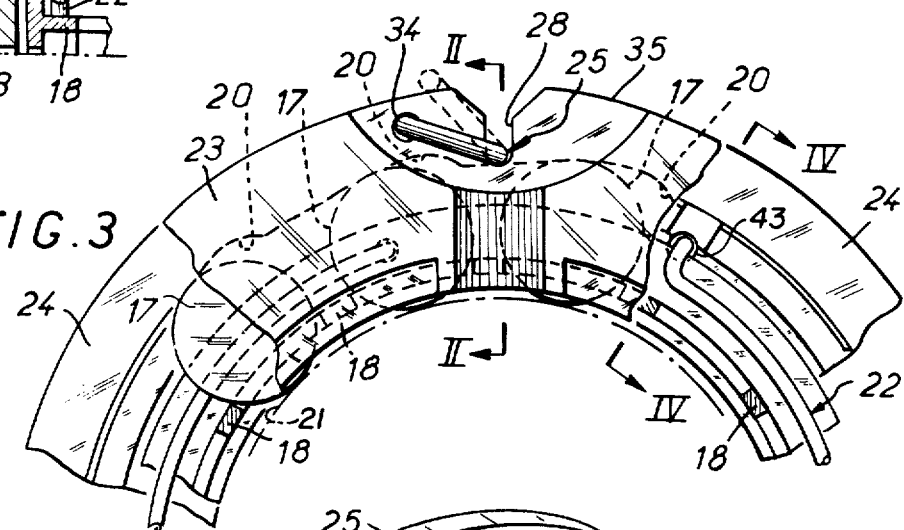
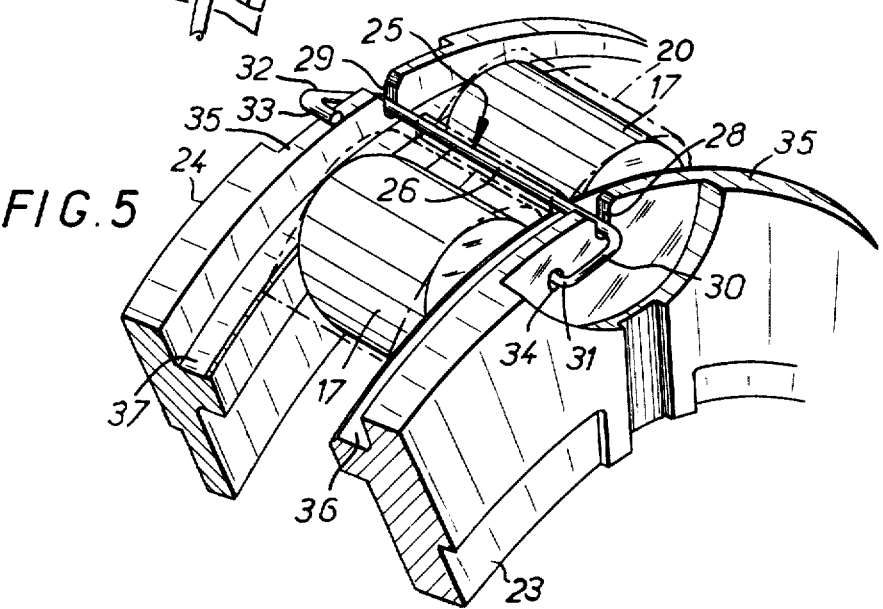

FREE-WHEELS

The present invention relates to a free-wheel forming a one-way coupling of the kind comprising a circular series of jamming members intended to be interposed between an outer track and an inner track coaxial with each other, at least one of these tracks having ramps which co-operate with the said jamming members, a synchronising cage in which the said jamming members are housed and which is subjected to an elastic restoring action, and two lateral closure rings.

In general it is the outer track which forms the ramp track. It is made of a special very hard steel of high mechanical strength so as to withstand the action of the jamming members. It is on this part that the lateral closure rings and the elastic restoring means for the cage are mounted, which necessitates a difficult and expensive machining operation on the said very hard part.

It is doubtless possible to simplify this machining to some extent by virtue of a large depth of fitting of the lateral closure rings, but this then results in a rather undesirable increase in the axial size of the free-wheel.

The present invention has for its object a free-wheel which is free from these disadvantages, and the construction of which is very simple, due to an arrangement of the lateral closure rings, which are made of a light alloy and can therefore be subjected without any difficulty to all operations of shaping and the like, whatever they may be.

According to a first aspect of the invention, the two lateral closure rings are directly interconnected by coupling means. These latter preferably comprise at least one straight pin parallel to the axis of the free-wheel and passing through this latter, the said pin having bent-back extremities which are respectively hooked on the said rings so as to retain the said rings axially. In addition, this pin is advantageously engaged in a groove formed in the ramp track in order to ensure angular immobilization of the rings and the ramp track.

It will be appreciated that this simple groove may be produced in a very convenient way in spite of the hardness of the ramp member. Furthermore, the hooking means of the pin are only formed in rings of light alloy, for example in the form of hooking holes, which does not present any difficulty in view of the materials of which these rings are made.

According to another aspect of the invention, in order to produce the elastic restoring action on the synchronization cage, springs of circular arcuate form are hooked by one extremity on this cage and by the other extremity on the two rings which are angularly fixed to the ramp track.

This hooking action is for example obtained by means of holes formed in the rings and which may be made without difficulty in view of the material, in particular a light alloy, of which these rings are made.

The two aspects of the invention may be adapted either separately or in combination.

Forms of embodiment of the invention are described below by way of example, reference being made to the accompanying drawings, in which:

FIG. 2 is a partial view to a larger scale of this free-wheel in cross-section taken along the line II-II of FIG. 3;

FIG. 3 is a partial view of the free-wheel in elevation, taken in the direction of the arrow III—III of FIG. 2 and with parts broken away;

FIG. 4 is a partial half-view taken along the line IV—IV of FIG. 3;

FIG. 5 is a partial view in perspective of the free-wheel;

Figure 1:
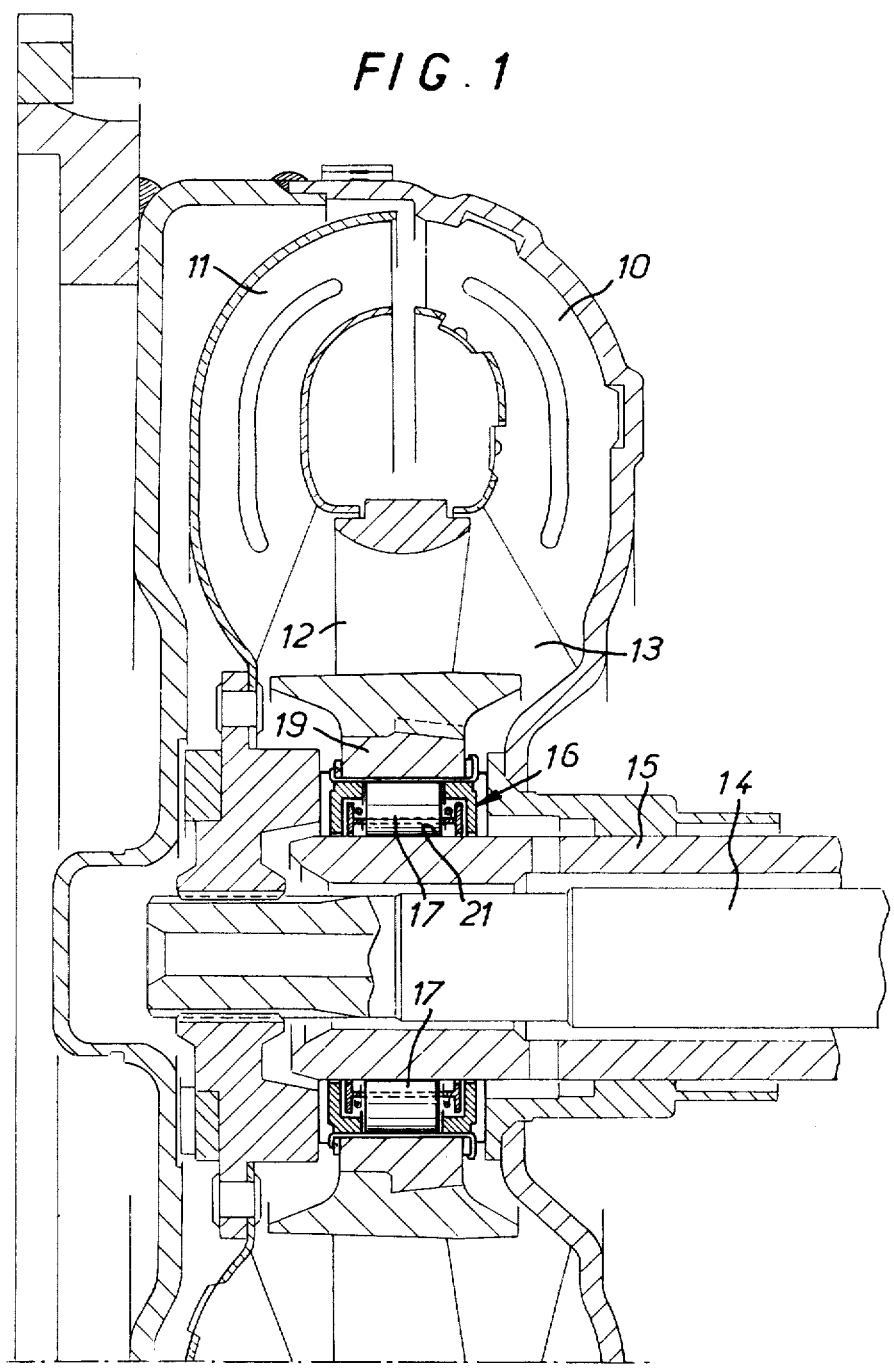
FIG. 1 is a partial view in longitudinal section of a hydrokinetic torque converter provided with a free-wheel according to the invention.
Figure 6:
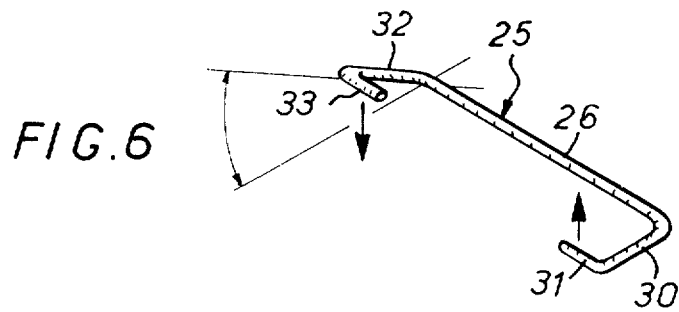
FIG. 6 shows a perspective view of an interconnecting pin for the two rings of the free-wheel.

Reference will first be made to FIGS. 1 to 6 which are concerned in a non-limitative manner, with an application of the invention to a hydro-kinetic torque converter. As shown in FIG. 1, this converter comprises an impeller wheel 10, a turbine wheel 11 and a reactor wheel 12 which define a toric oil chamber 13.

The impeller wheel 10 is intended to be driven by a motor. The turbine wheel 11 is coupled for rotation to a receiving shaft 14. The reactor wheel 12 co-operates with a fixed support 15 through the intermediary of a one-way coupling or free-wheel 16 in such manner that on the one hand the reactor wheel 12 is fixed on the support 15 in the conversion phase in which it has a tendency to rotate in the opposite direction of rotation to that of the wheels 10 and 11, and so that on the other hand it is permitted to rotate in the same direction as the wheels 10 and 11 in the coupling phase.

The free-wheel 16 (FIGS. 2 to 5) comprises a circular series of jamming members consituted by rollers 17 in the example of FIGS. 1 to 4. The rollers 17 are housed in a cylindrical synchronization cage 18 and co-operate on the one hand with an outer track 19 of very hard special steel, having as many jamming ramps 20 as there are rollers 17 and on the other hand with an inner track 21 formed by a cylindrical bearing surface on the fixed support 15.

Elastic means such as two springs 22 which are described below in detail, act on the cage 18 so as to ensure the jamming of the rollers 17 against the ramps 20 when the wheel 12 tends to rotate in the direction of rotation opposite to that of the wheels 10 and 11, and permit the rollers 17 to be freed from the ramps 20 when the wheel 12 tends to rotate in the same direction of rotation as the wheels 10 and 11.

The system formed by the rollers 17, the cage 18 and the springs 22 is retained with respect to the reactor wheel 12 by two lateral closure rings 23 and 24 of light alloy, which serve at the same time to absorb the axial thrust through the wheeel 12, which is developed between the wheels 10 and 11, and thus contribute to the maintenance of the relative positions of the various wheels 10, 11 and 12.

The rings 23 and 24 are engaged at 36 and 37 in the track 19, and in order to ensure their maintenance in engagement and also their angular fixing to the track 19, these rings 23 and 24 are directly interconnected by coupling means 25 in the form of pins (FIG. 5).

Each pin 25 has a main straight portion 26 parallel to the axis and engaged in a groove 27 of the outer track 19. The main straight portion 26 of the pin 25 is engaged, in the vicinity of its extremities, in slots 28 and 29 of the rings 23 and 24. The portion 26 is extended on one side by an elbowed portion 30 bent back prependicularly to the portion 26 and then by an end portion 31 bent back parallel to the portion 26. In the same manner, the portion 26 is extended on the other side by an elbowed portion 32 bent back perpendicularly to the portion 26 and then by an end portion 33 bent back parallel to the portion 26. The two portions 31 and 33 are directed towards each other and when the pin 25 is in a free condition, as shown in dotted lines in FIG. 3, are in the extension of each other.

The extremity 31 is engaged (see FIG. 5) in a hole 34 of the ring 23, while the extremity 33 rests on the periphery 35 of the ring 24, so that the extremities 31 and 33 are angularly displaced with respect to each other, with a torsion effect which assists in keeping the pin 25 in position.

A number of retention pins 25 are provided, suitably distributed. For example, two diametrically-opposite pins 25 may be provided and permit very good results to be obtained.

Each spring 22 has a circular arcuate form having an angular extent slightly less than 360°. One extremity 40 of the spring 22 is hooked in a hole 42 in the cage 18 (see FIG. 2) while the other extremity 41 of the spring 22 is hooked in a hole 43 of the corresponding ring 23 or 24 (see FIG. 4).

The extremities 40 and 41 of the springs 22 opposite each other, while the extremities 41 of the extend away from each other.

With the construction which has just been described, machining operations on the hard part 19 are avoided except for the grooves 27 which are very easy to machine, and even as to these machining oprations, slots 28, 29, holes 34, holes 43, are made in the rings 23 and 24 of light alloy and are thus very easily made. It will be appreciated that the direct interconnection of the rings 23 and 24 by the pins 25 provides an excellent axial retention of these rings and their angular fixing with the track 29, while the springs 22 are themselves hooked in a very robust manner in the holes 42 and 43.

Figure 7:
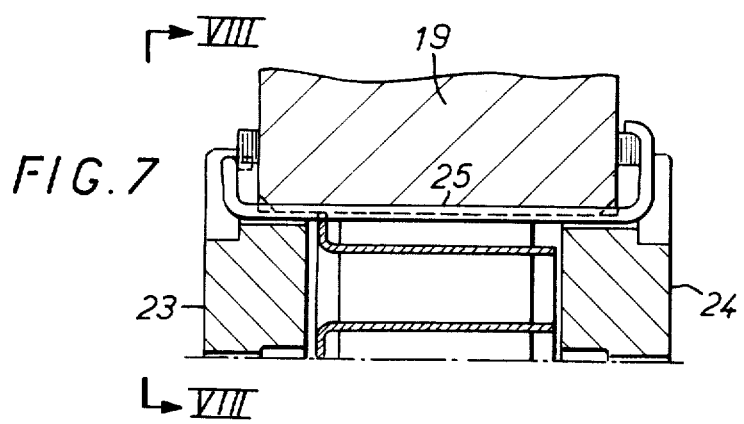
FIG. 7 is a view similar to FIG. 2 but relating to an alternative form, shown in cross-section taken along the line VII—VII of FIG. 8.
Figure 8:
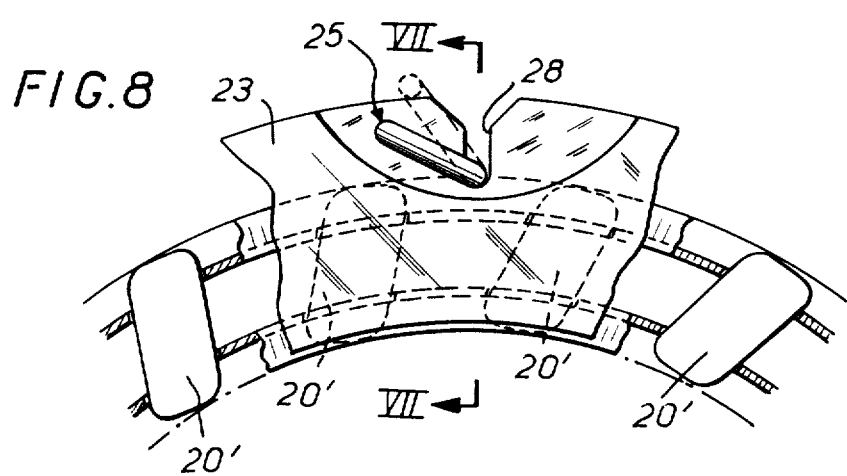
FIG. 8 is a corresponding view in elevation in the direction of the arrows VIII- VIII of FIG. 7.

In the alternative form shown in FIGS. 7 and 8, the arrangement is similar to that which has just been described with reference to FIGS. 1 to 6, but the jamming members, instead of being formed by the rollers 20, consist of shaped rollers 20' which are also known as "sprags." In particular, there are again seen in FIGS. 7 and 8, at 25, the interconnecting pins for the rings 23 and 24.

What I claim is:

1. A free-wheel forming a one-way coupling device comprising a circular series of jamming members adapted to be interposed between an outer track and an inner track coaxial with each other, a plurality of ramps provided on at least one of said tracks, said ramps being adapted to cooperate with said jamming members, a synchronization cage for housing said jamming members, said cage being subjected to an elastic restoring action, and two lateral closure rings, said free-wheel further comprising coupling means for directly interconnecting said two closure rings, said coupling means comprising at least one straight pin parallel to the axis of said free-wheel and passing through this latter, said pin having its extremities elbowed in such manner as to retain said closure rings axially.

2. A free-wheel as claimed in claim 1, in which said pin is engaged in a groove formed in said track with ramps in such manner as to ensure the angular fixing of said rings to said ramp track.

3. A free-wheel as claimed in claim 1, in which said pin is engaged, in the vicinity of its extremities, in slots provided in said lateral closure rings.

4. A free-wheel as claimed in claim 1, in which the elbowed extremities of said pin are bent back in such manner that one extremity is engaged in a hole in one ring while the other is engaged on the periphery of the other said lateral closure ring.

5. A free-wheel as claimed in claim 4, in which said pin is elastic and when at rest has its two turned-back extremities in alignment, whereas in the assembled position in which one of said extremities is engaged on the periphery of the other said ring, said pin is subjected to a stress which locks said pin in said assembled position.

6. A free-wheel as claimed in claim 1, in which a plurality of said pins is provided.

7. A free-wheel as claimed in claim 6 in which two said pins are provided in diametrically-opposite positions.

8. A free-wheel forming a one-way coupling device comprising a circular series of jamming members adapted to be interposed between an outer track and an inner track coaxial with each other, a plurality of ramps provided on at least one of said tracks, said ramps being adapted to cooperate with said jamming members, a synchronization cage for housing said jamming members, means for applying an elastic restoring action to said cage, and two lateral closure rings, said elastic restoring means acting on said cage being constituted by springs of circular arcuate form hooked at one extremity to said synchronization cage and at the other extremity to said two lateral closure rings which are angularly fixed to said track provided with ramps, said springs of circular arcuate form being two in number and having their hooking extremities on said cage and said rings extending away from each other.

* * * * *